United States Patent [19]
Mattson

[11] Patent Number: 5,373,337
[45] Date of Patent: Dec. 13, 1994

[54] METHOD AND APPARATUS FOR SORTING EXCESSIVE CORE SET FILM

[75] Inventor: Christopher T. Mattson, Rochester, N.Y.

[73] Assignee: Eastman Kodak Company, Rochester, N.Y.

[21] Appl. No.: 164,180

[22] Filed: Dec. 9, 1993

[51] Int. Cl.$^5$ .................. G03B 1/00; G03D 13/00
[52] U.S. Cl. ............................. 354/215; 354/298; 354/314
[58] Field of Search ............... 354/173.1, 173.11, 212, 354/214, 215, 216, 298, 314

[56] References Cited

U.S. PATENT DOCUMENTS

| | | | |
|---|---|---|---|
| 3,552,563 | 1/1971 | Smith | 209/115 |
| 4,632,533 | 12/1986 | Young | 355/3 SH |
| 4,933,693 | 6/1990 | Beach | 354/203 |

*Primary Examiner*—David M. Gray
*Attorney, Agent, or Firm*—Frank Pincelli

[57] ABSTRACT

A method, and apparatus for performing the method, of detecting excessive core set film curl of a filmstrip wound within a film cartridge of the type having a light trapping film slit through which the leading end of the filmstrip may be advanced or retracted, whereby excessively curled filmstrips may be pre-sorted prior to photofinishing operations. The method and apparatus comprises the steps of and means for positioning the film cartridge with the light trapping slit thereof oriented in a predetermined position, unwinding the leading end of the filmstrip a predetermined distance out of the light trapping slit of the film cartridge, whereby the unwound leading end of the filmstrip may freely curl back in the direction in which the filmstrip is wound within the film cartridge to the extent that the filmstrip exhibits core set film curl, and detecting an excessive degree of core set film curl by the amount to which the unwound leading end of the filmstrip curls back toward the film cartridge. Thereafter, the leading end may be rewound into the cartridge and cartridges found to contain excessively curled filmstrips may be separated from those containing filmstrips exhibiting a normal range of core set film curl.

20 Claims, 2 Drawing Sheets

METHOD AND APPARATUS FOR SORTING EXCESSIVE CORE SET FILM

FIELD OF THE INVENTION

The present invention relates generally to handling exposed photographic filmstrips during photofinishing, including processing and printing or mounting, and, more particularly, to sorting normally curled, exposed filmstrips suitable for normal splicing and transport from excessively core set filmstrips having a degree of film curl negatively affecting its ability to be spliced and transported, so that the excessively core set film may separately handled to ensure correct processing and printing or mounting.

BACKGROUND OF THE INVENTION

In typical 35 mm film cartridges, file filmstrip is withdrawn by its "film leader" from the cartridge and advanced past a rectangular exposure window or space gale and wound up on a take-up reel until all potential image frames of the filmstrip are exposed. In more recently proposed "thrust" cartridges, the filmstrip may be advanced out of the light trapping slit or mouth of the cartridge shell by rotating the film spool in an unwinding direction as described in commonly assigned U.S. Pat. No. 4,933,693, incorporated herein by reference in its entirety. Thus, in use, the cartridge may be loaded in the camera without any exposed leader protruding from the shell slit and advanced, after the camera film loading door is closed, by a motorized drive mechanism until the first image frame is positioned for exposure. The thrust cartridge avoids any unnecessary waste of the film leader and initial frames on loading into the camera. Moreover, it is contemplated that developed negative filmstrips may be returned to the customer wound back into the cartridge for safekeeping. In any case, the filmstrip is automatically or mechanically rewound into the film cartridge of either type upon exposure of all image frames, and the cartridge is removed for processing and printing or mounting, in the case of positive film.

Before the filmstrip is completely exposed, it may reside tightly wound in the cartridge or partially unwound within the camera for a period of time and under varying conditions of temperature and humidity such that the film takes a "core set" affecting the degree to which the film curls back upon itself when unrestrained. When the filmstrip is originally manufactured and cut to length, it is generally fairly limp and relatively easy to maintain straight (because it is wound on a relatively large diameter core and maintained at 50-60% relative humidity). After winding onto the core of the film cartridge, the innermost layers of the filmstrip wound around the core take on a higher degree of curl (given the relatively smaller diameter) than the outermost layers, and the degree of curl becomes more pronounced with the passage of time and exposure to elevated temperature and/or low humidity. Moreover, with use of the thrust cartridge to store developed film, core set film curl may become more likely and more pronounced with the passage of time and be more apparent when prints are re-ordered from the aged filmstrip. This is particularly true if the spool diameter is small and the film base is thin, relative to the thickness of the emulsion layers, in order to miniaturize dimensions of the cartridge.

Thus, the degree of core set film curl and its frequency of occurrence varies considerably due to its type, age, and environment to which it has been exposed in use and storage. This inconsistent core set film curl may make it difficult for photofinishing equipment to handle the film during splicing, processing and printing or mounting in certain photofinishing operations, individual filmstrips are withdrawn or advanced from the film cartridge and dragged through developing and fixing baths during processing, wherein the film transport mechanism does not restrain the free end of the filmstrip. A number of film base materials absorb fluids in the baths and become more limp than when they are first withdrawn from the cartridge. Other film base materials are more hydrophobic, and the excessive film curl, particularly of the more hydrophobic filmstrips, may cause the film to roll up or be folded back on itself and be damaged as it sticks together or may jam film transporting mechanisms in the processing, splicing, printing or mounting equipment. The film handling characteristics of transporting mechanisms vary widely and are typically preset or configured to accommodate an "average" film curl and are not readily adjusted without operator input. Thus, the equipment must be monitored, and halted if a malfunction occurs. Suspect filmstrips may be irreversibly damaged or have to be removed and be straightened, which may be difficult to do.

One solution to the problem would be to subject all filmstrips to a "de-curling" operation on withdrawal of the filmstrip from the cartridge and prior to processing, printing or mounting. Such de-curling operations include wrapping the filmstrip around a heated drum opposite to the curvature of the filmstrip for a certain time to straighten it. Doing so for every filmstrip would obviously introduce extra delay and cost and could negatively impact sensitometric performance. In this respect, if the applied heat and tension is not well controlled and tailored to the film type, more sensitive film types may shift in color balance or speed resulting in lower quality prints. The additional handling itself introduces the possibility of physical damage, e.g. scratching of the emulsion layers.

It would be therefor be desirable to overcome the problems and risks in film handling occasioned by the infrequently occurring excessively curled filmstrip without subjecting all filmstrips to de-curling.

SUMMARY OF THE INVENTION

It is therefor a principal object of the invention to decrease filmstrip handling problems, particularly in photofinishing operations, occasioned by excessively curled filmstrips.

It is a further object of the invention to detect and son excessively curled filmstrips from normal curl filmstrips for special handling to avoid introducing handling problems of filmstrips during photofinishing operations.

These and other objects of the invention are met in accordance with a first aspect of the invention, through an apparatus, and method of operation thereof, for detecting excessive core set film curl at the leading end of the filmstrip protruding from the shell of the film cartridge comprising means for positioning the film cartridge with the light trapping slit thereof oriented in a first position, means for advancing the leading end of the filmstrip out of the light trapping slit of the shell, first deflecting means positioned with respect to said first position for receiving the leading end of the filmstrip as it is advanced if the filmstrip evidences a degree of film curl within a normal range of curl, second deflecting means positioned with respect to said first position for receiving the leading end of the filmstrip as it is advanced if the filmstrip evidences an excessive degree of film curl beyond the normal range of curl, and means or classifying and separating the filmstrips for further processing from the receipt of the leading end of the filmstrip by one or the other of the first and second deflecting means.

Stated another way, the invention is realized in a method, and apparatus for performing the method, of detecting excessive core set film curl of a filmstrip wound within a film cartridge of the type having a light trapping film slit through which the leading end of the filmstrip may be advanced or retracted comprising the steps of and means for: positioning the film cartridge with the light trapping slit thereof oriented in a predetermined position; unwinding the leading end of the filmstrip a predetermined distance out of the light trapping slit of the film cartridge, whereby the unwound leading end of the filmstrip may freely curl back in the direction in which the filmstrip is wound within the film cartridge to the extent that the filmstrip exhibits core set film curl; and detecting an excessive degree of core set film curl by the amount to which the unwound leading end of the filmstrip curls back toward the film cartridge.

In accordance with the invention the apparatus and method may be employed to pre-sort filmstrips prior to processing or upon return of a processed roll of negative film for printing or it may be employed to separate and divert normal curl filmstrips directly to a photofinishing line and excessively curled filmstrips first to a de-curling line or operation. The apparatus and method may preferably be employed with the thrust cartridge, where the leading end of the filmstrip may be advanced automatically out of the light trapping slit toward the first and second deflecting means. With respect to the typical 35 mm film cartridge, the leading end of the filmstrip may be withdrawn a preset distance from the slit and the leading end of the film may be advanced toward the first and second deflecting means by a drive mechanism that attaches to the cartridge spool and/or filmstrip.

The invention thus advantageously allows excessively curled filmstrips to be rapidly and automatically sorted from normally curled filmstrips for separate de-curling and handling. Thus malfunctions occasioned by excessively curled filmstrips in film transporting equipment during photofinishing may be avoided, reducing cost and time lost in repeating photofinishing operations.

BRIEF DESCRIPTION OF THE DRAWINGS

Other objects, advantages and features of the present invention will become apparent from the following specification when taken in conjunction with the accompanying drawings in which like elements are commonly enumerated and in which.

The drawings are not necessarily to scale.

DETAILED DESCRIPTION OF THE PREFERRED EMBODIMENTS

The invention is disclosed as being embodied preferably in conjunction with 35 mm still camera cartridge or cassette filmstrips, and more specifically in reference to thrust style cartridges containing a hydrophobic film base filmstrips. It will be understood that the principles of the invention may be applied to other types of 35 mm film cartridges and cartridges for other film formats as exist or may be developed wherein core set film curl may evidence itself.

As mentioned above, details of 35 mm thrust style film cartridges are set forth in the above incorporated '693 patent as well as commonly assigned U.S. Pat. No. 4,423,943 and patent application Ser. No. 221,955 filed Jul. 20, 1988 to Harvey. Consequently, the detailed description thereof is not repeated herein. The principles of the invention are described in reference to the schematic illustrations which may be implemented with such film cartridges and equivalents thereof in a manner apparent to those of skill in the art.

Figure 1:
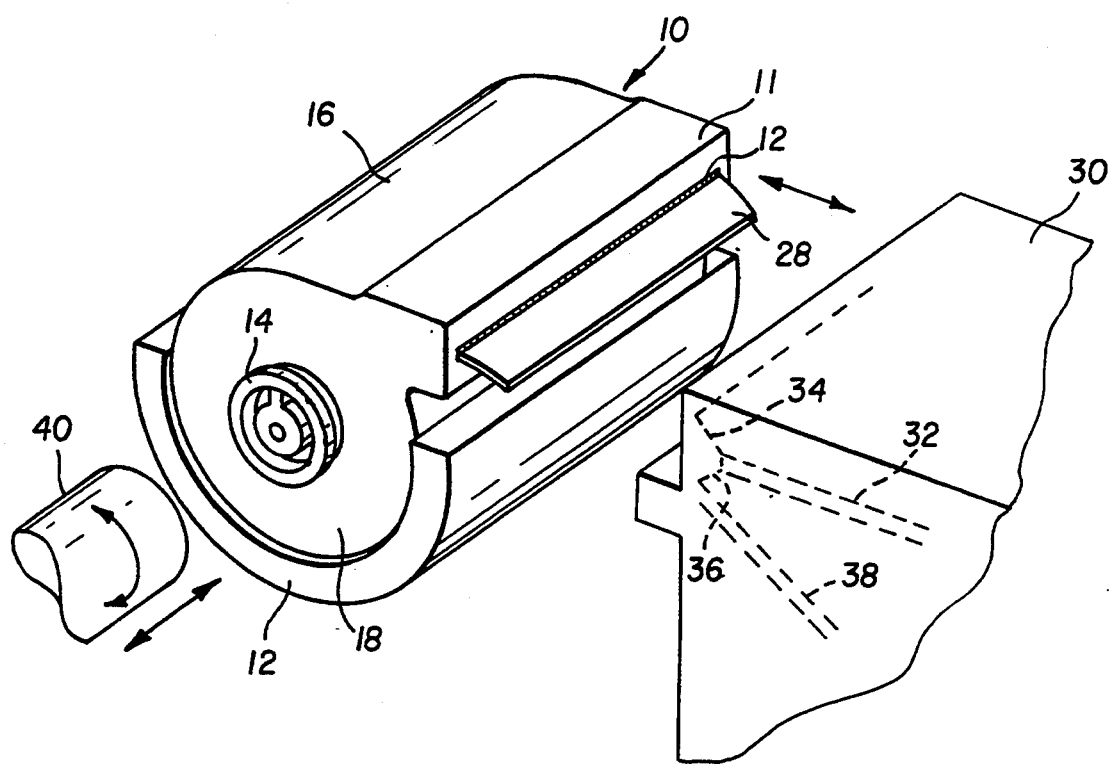
FIG. 1 is a perspective view of a thrust type cartridge in relation to a supporting and positioning fixture in a pre-sort position.

Turning to FIG. 1, a thrust type cartridge 10 is depicted in a perspective view in relation to a supporting and positioning fixture 20 in a presort position. The cartridge 10 is positioned and supported in a box-like fixture 20 so that its light trapping slit 12 of the snout or extension portion 11 is directed toward a deflector mechanism 30 and so that its internal spool core or hub extension 14 is aligned to a drive mechanism 442). It will be understood that each cartridge 10 may be oriented in and dropped from a hopper or the like into the fixture 20, and a ram may be moved toward the end of the cartridge 10 to move it toward the drive mechanism 40. The drive mechanism 40 may engage the spool 14 of the cartridge 10 which then aligns the portion 11 toward the deflector mechanism 30, whereupon the sorting; test may be commenced as described below.

Various filmstrip and cartridge handling options are envisaged for manually or automatically sorting the tested filmstrips and/or cartridges. In a first embodiment, after the test is completed, it will be understood that the cartridge 10 would be automatically mechanically ejected, particularly if its film exhibits normal curl, or an alarm would sound to alert the operator if its film exhibits excessive film curl, so that the operator may remove or retest the film for excessive curl.

In a more automated system, the excessively curled filmstrip containing film cartridge would be automatically diverted into a reject bin. In a fully automated system, normal curl filmstrip containing cartridges would be directed to a normal film processing line, the filmstrip withdrawn and detached from the cartridge and continuously fed into a splice station, film processor, etc. Excessively curled filmstrip containing cartridges would be diverted to a decurling line where the filmstrip would be subjected to the above described decurling process, and such filmstrips could be either processed separately or returned to the normal film processing line.

Figure 2:
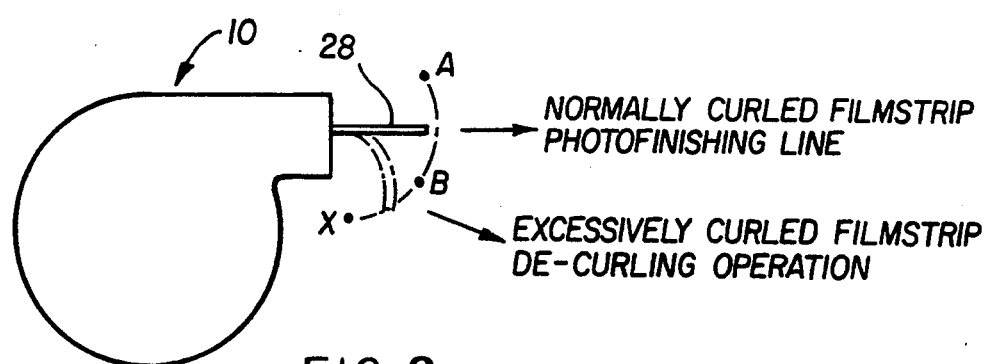
FIG. 2 depicts in a side schematic illustration, the range of normal and excessively curled filmstrip that is distinguishable in accordance with the invention.

Turning now to FIG. 2, it depicts in a side schematic illustration, the range of normal and excessively curled filmstrip that is distinguishable in accordance with the invention. The leading end 28 extending from the cartridge slit 12 a selected, fixed length may exhibit a "normal" curl in the range of the arc A–B and excessive curl in the range of the arc B–X. The common angular limit B of the two ranges may be selected so that processor and printer transport and slide mounting problems due to excessive film curl will be eliminated for a specific make of such photofinishing equipment. In photofinishing, film curl is a recognized phenomena that has been quantified and characterized in an ANSI/ASC Standard PH1.29, released in 1985 related to methods for determining film curl. Degrees of film curl are characterized in terms of the radius of curvature exhibited by a standard sized, rectangular film sample. As a representative selection of the angular limit B, it may be that point along the curve A–X that would correspond to a radius of curvature of 13.3 ram, which is characterized as an ANSI curl #75, if the selected length of the filmstrip leading end 28 satisfied the standard sample size. Since the selected length and the standard width of the leading end 28 does not necessarily satisfy the standard size sample, the position B may be selected by trimming a standard sample with a #75 curl to the selected leading end 28 dimensions and empirically determining the common angular limit. In a representative lot of cartridges, less than 10% will exhibit an excessive curl requiring de-curling or other special handling when such a limit position B is selected.

The excessively curled filmstrips may be de-curled as described above, by wrapping the filmstrip, against the direction of curl, around a heated drum and heating the filmstrip to a temperature that relaxes the film base. The wrapping and heating operations may be conducted prior to or following development of the filmstrip.

In accordance with an embodiment of the present invention as further illustrated in FIG. 2, filmstrips evidencing normal curl in the leading end 28 are automatically processed in the normal fashion on the preferably automated photofinishing line. Excessively curled filmstrips are automatically directed to the de-curling line or operation for de-curling of the filmstrip as described above and the straightened filmstrip is introduced into the normal filmstrip photofinishing line. In this respect, the filmstrips may be either ejected from the test system within their cartridges or the filmstrips may be advanced from the cartridges and drawn to the respective photofinishing or decurling lines while the cartridges remain in the fixture 20 of FIG. 1.

Returning to FIG. 1, the thrust type cartridge 10 comprises a light tight, generally cylindrical outer shell or case 16 which is formed with an elongated extension portion 11 terminating in the light trapping slit 12 through which the leading end 28 of the filmstrip 26 may be thrust out as described below. The light trapping slit 12 is as wide as the 35 mm filmstrip and may be lined with a known velvet or plush material that bears against the opposite surfaces of the filmstrip 26 in a manner well known in the art. When positioned in the fixture 20, the cartridge 10 is automatically directed so that the leading end 28 of the filmstrip 26 exiting extension portion 11 faces the deflector mechanism 30 in the orientation depicted. The mechanism 30 and the fixture 20 are brought together in the direction of the arrow until the extension 11 is supported by the mechanism 30 as best depicted in FIGS. 3 and 4.

The extension portion 11 may have a light lock door mechanism for releasing tension on the filmstrip 26 to advance it out the light trapping slit 12 that is actuated at the same time. The drive mechanism 40 then rotates the internal hub or spool 15 in the unwind direction to thrust the leading end 28 of the filmstrip out the slit 12 so that a controlled length is exposed. In that controlled length, the leading end 28 of the filmstrip will curl an amount proportional to the degree of core set film curl. The deflector mechanism 30 is provided to distinguish normally and excessively curled film.

Figure 3:
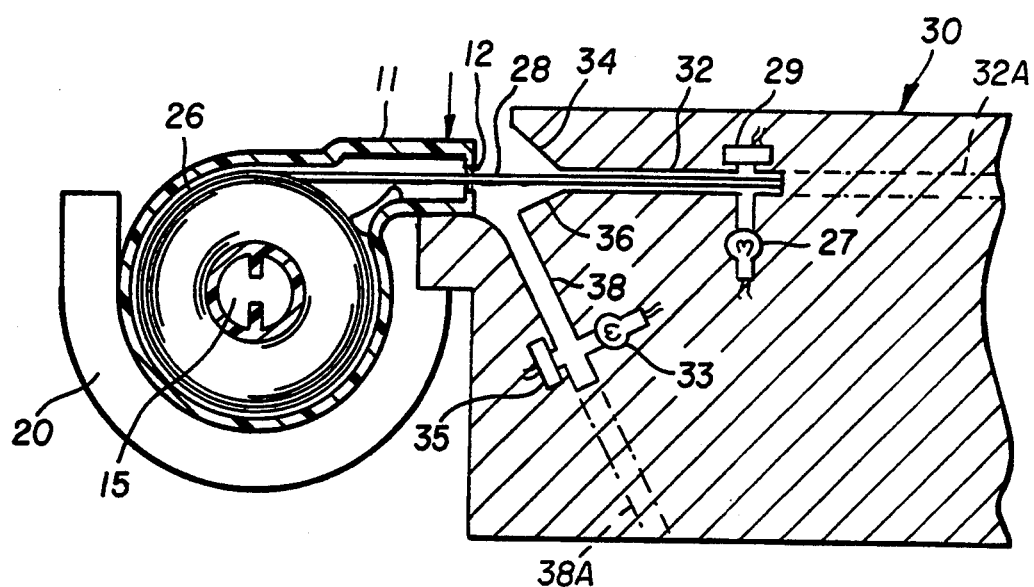
FIG. 3 is a side sectional view of the internal structure of the deflector mechanism and its construction with respect to the ranges depicted in FIG. 2 and the film cartridge and depicting the detection of a filmstrip evidencing a normal range of film curl.
Figure 4:
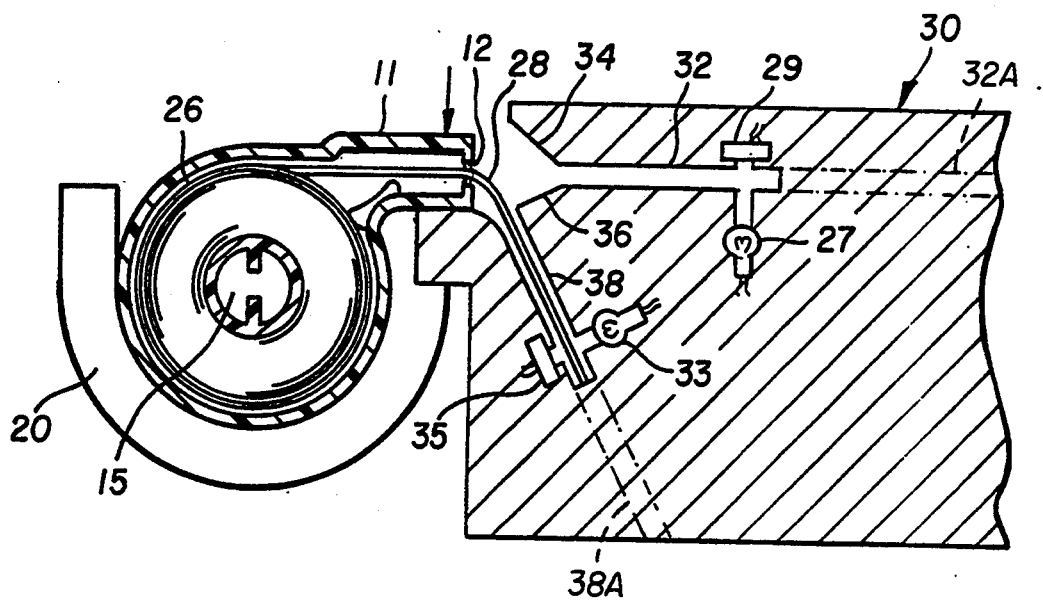
FIG. 4 is a side sectional view of the internal structure of the deflector mechanism and its construction with respect to the ranges depicted in FIG. 2 and the film cartridge and depicting the detection of a filmstrip evidencing an excessive range of film curl.

The internal structure of the deflector mechanism 30 and its construction with respect to the ranges depicted in FIG. 2 is shown in greater detail in the schematic, side sectional views of the embodiments of FIGS. 3 and 4. As mentioned above, the extension 11 is in contact with the mechanism 30. A downward force indicated by the downward directed arrows may be applied to position the slit 12. The filmstrip 26 is depicted wound on the spool 15 in the shell 16 with its leading end 28 extending toward and into a first elongated slot 32 having a mouth defined by first deflector surfaces 34, 36. The surfaces 34, 36 intercept the range of the arc A–B of FIG. 2, so that the leading end 28 of normally curled filmstrip 26 contacts first or second deflector surfaces 34, 36 and is diverted into the slot 32. In order to detect the normal curled filmstrip 26 and halt the advance of its leading end 28, a first light source 27 and photodetector 29 are positioned on either side of the first elongated slot 32. The opaque leading end 28 interrupts the light beam and photo-detector signal of the first photo-detector 29 to provide a confirmation that the filmstrip 26, in this case, is not excessively curled. Thereafter, the drive mechanism 40 is energized to rewind the leading end 28 of the filmstrip 26 into the cartridge 10. Thus, in operation, normally curled filmstrips 26 directed into the first elongated slot 32 are detected by the interruption of the light beam. The drive mechanism 40 is then reversed to rewind the leading end 28 into the slit 12, and the cartridge 10 is ejected from the fixture 20 and into an acceptable container or to a further location of the normal film curl photofinishing line as described above.

In FIG. 4, the leading end 28 of an excessively curled filmstrip 26 curls downward at such an angle that it does not contact the second deflector surface 36 and instead is diverted into the second elongated slot 38. The opaque leading end 28 extends in second elongated slot 38 between a second light source 33 and second photo-detector 35 positioned in the opaque deflector mechanism 30. The opaque leading end 28 interrupts the light beam and photodetector signal to provide a confirmation that the filmstrip 26 is excessively curled, in this case. Thereafter, the drive mechanism 40 is energized to rewind the leading end 28 of filmstrip 26 into the cartridge 10. Thus, in operation, excessively curled filmstrips 28 directed into the second elongated slot 38 are detected by the interruption of the second light beam. An alarm may be sounded so that the operator can remove the excessively curled film cartridge. Alternatively, the excessively curled filmstrip containing cartridge may be automatically ejected into a reject bin or diverted to the de-curling line as described above.

In a further variation on the embodiment depicted in FIGS. 3 and 4, only the second light source 33 and photo detector 35 are provided in the slot 38, and the slot 32 is extended by slot extension 32A indicated in dotted lines all the way through the deflector mechanism 30. In this embodiment, the apparatus of the invention may be positioned with respect to the transport mechanism of the normally curled filmstrip photofinishing line (not shown). The normally curled filmstrip leading end 28 entering slot 32 may be advanced all the way through the mechanism 30 along the slot extension 32A and engaged by the adjacent transport mechanism and pulled out or be driven from the cartridge 10 for normal film processing. Excessively curled filmstrip would be detected in slot 38 and handled as described above.

In a still another embodiment, the slot 38 would also extend by slot extension 38A as shown in dotted lines through the mechanism 30 so that the leading end 28 of excessively curled film entering slot 38 would also be automatically directed out through second slot extension 38A to the de-curling line or operation. Except for possible counting purposes, it would not be necessary to employ the second light source 33 and photo-detector 35 in this case.

While the preferred embodiment has been described in relation to a thrust type film cartridge wherein the leading end of the filmstrip may be driven out of the cartridge, it will be understood that the curl of a filmstrip in a regular or normal style cartridge may be tested. In such an operation, it would be necessary to pull the leading end of the filmstrip out to a predetermined length by a filmstrip engaging pair of pinch rollers or a sprocket or a claw type drive mechanism. For example, the leading end of the filmstrip may be grasped and pulled out if it is shorter than a predetermined length or the leading end may be set to the length marking position and the cartridge spool wound if the leading end is longer than the predetermined length. In either case, the resulting advanced leading end and the deflector mechanism 30 may be brought together, and the curl of the filmstrip will cause the leading end to enter either of the elongated slots 32 or 38 resulting in the detection of the degree of core set film curl described above.

While there has been shown what are considered to be the preferred embodiments of the invention, it will be manifest that many changes and modifications may be made therein without departing from the essential spirit of the invention. It is intended, therefore, in the following claims to cover all such changes and modifications as may tall within the true scope of the invention.

PARTS LIST thrust type cartridge 10
elongated extension portion 11
light trapping slit 12
internal spool core or hub extension 14
internal hub or spool 15
outer shell or case 16
case ends 18, 19
supporting and positioning fixture 20
filmstrip 26
first light source 27
leading end 28
first photo-detector 29
deflector mechanism 30
first elongated slot 32
first slot extension 32A
second light source 33
first deflector surface 34
second photo-detector 35
second deflector surface 36
second elongated slot 38
second slot extension 38A
drive mechanism 40

I claim:

1. Apparatus for detecting excessive core set film curl of an elongated filmstrip of a film cartridge having a light trapping film slit comprising:
    means for positioning rite film cartridge with the light trapping slit thereof oriented in a predetermined position;
    means tier advancing the leading end of the filmstrip out of the light trapping slit of the film cartridge whereby the leading end of the filmstrip may freely curl with respect to the longitudinal axis thereof;
    first deflecting means positioned with respect to said predetermined position for receiving the leading end of the advancing filmstrip evidencing a degree of film curl within a normal range of curl;
    second deflecting means positioned with respect to said predetermined position for receiving the leading end of the advancing filmstrip evidencing an excessive degree of film curl beyond the normal range of curl; and
    means responsive to the receipt of said leading end of said filmstrip in said first or said second deflecting means for classifying said filmstrips as a function of film curl.

2. The apparatus of claim 1 wherein said classifying means further comprises:
    means tier detecting the receipt of the leading end of the filmstrip by at least said first or said second deflecting means on operation of said advancing means.

3. The apparatus of claim 2 wherein said first and second deflecting means further comprise:
    a deflector mechanism formed with a first slot for receiving normally curled film advanced by said advancing means and a second slot for receiving excessively curled film advanced by said advancing means, said deflector mechanism having deflector surfaces formed in relation to said first slot for deflecting said leading end of the advanced filmstrip evidencing a normal range of film curl.

4. The apparatus of claim 3 wherein said detecting means is positioned with respect to at least said first or second slot for detecting the entry of the leading end of the normally curled or excessively curled filmstrip therein.

5. The apparatus of claim 4 wherein said detecting means further comprises:
    first and second light emitting means positioned with respect to said first and second slot, respectively for emitting light in first and second light beams extending across the widths of said first and second slots, respectively; and
    first and second light detecting means positioned with respect to said first and second slob, respectively, tier detecting said light beams in the absence of a leading end of a filmstrip extending into said first or second slot and interrupting said first or second light beam, whereby signals indicative of normal or excessively curled filmstrips may be generated.

6. A method of detecting excessive core set film curl of an elongated filmstrip wound within a film cartridge of the type having a light trapping film slit through which the leading end of the filmstrip may be advanced or retracted comprising the steps of:

positioning the film cartridge with the light trapping slit thereof oriented in a predetermined position:

advancing the leading end of the filmstrip out of the light trapping slit of the film cartridge so that the leading end of the filmstrip may freely curl with respect to the elongated axis of the filmstrip to the extent that the filmstrip exhibits core set film curl;

receiving the leading end of the advancing filmstrip evidencing a degree of film curl within a normal range of curl within a first slot;

receiving the leading end of the advancing filmstrip evidencing an excessive degree of core set film curl beyond the normal range of film curl within a second slot; and diverting said filmstrips received in said second slot for separate processing from said filmstrips received in said first slot.

7. The method of claim 6 wherein said first and second receiving steps further comprise:

providing a deflector mechanism formed with said first slot for receiving normally curled filmstrips advanced during said advancing step and said second slot for receiving excessively curled filmstrips advanced during said advancing step, said deflector mechanism having deflector surfaces formed in relation to said first slot for deflecting said leading end of the advanced filmstrip evidencing a normal range of film curl to said first slot.

8. The method of claim 6 further comprising the step of:

detecting file receipt of the leading end of the filmstrip by at least one of the first or second slots.

9. The method of claim 8 wherein said detecting step further comprises the step of:

positioning detecting means with respect to at least one of said first and second slots for detecting the entry of the leading end of the normal or excessively curled filmstrip therein.

10. The method of claim 8 wherein said detecting step further comprises the steps of:

emitting first and second light beams extending across the widths of said first and second slots, respectively; and detecting said first or second light beam in the absence of a leading end of a filmstrip extending into said first or second slot, respectively, and interrupting said first or second light beam, whereby first or second signals indicative of normally and excessively curled filmstrips may be generated.

11. A method of detecting excessive core set film curl of a filmstrip wound within a film cartridge of the type having a light trapping film slit through which the leading end of the filmstrip may be advanced or retracted comprising the steps of:

positioning the film cartridge with the light trapping slit thereof oriented in a predetermined position;

unwinding the leading end of the filmstrip a predetermined distance out of the light trapping slit of the film cartridge, whereby the unwound leading end of the filmstrip may freely curl back in the direction in which the filmstrip is wound within the film cartridge to the extent that the filmstrip exhibits core set film curl; and detecting an excessive degree of core set film curl by the amount to which the unwound leading end of the filmstrip curls back toward the film cartridge.

12. The method of claim 11 wherein said detecting step further comprises the steps of:

positioning first deflecting means with respect to said predetermined position for receiving the leading end of the advancing filmstrip evidencing a degree of film curl within a normal range of curl;

positioning second deflecting means with respect to said predetermined position for receiving the leading end of the advancing filmstrip evidencing an excessive degree of core set film curl beyond the normal range of film curl; and detecting the receipt of the leading end of the filmstrip by at least one of the first and second deflecting means.

13. The method of claim 11 wherein said first and second positioning steps further comprise:

providing a deflector mechanism formed with said first slot receiving normally curled filmstrips advanced during said advancing step and said second slot for receiving excessively curled filmstrips advanced during said advancing step, said deflector mechanism having deflector surfaces formed in relation to said first slot for deflecting said leading end of the advanced filmstrip evidencing a normal range of film curl into said first slot.

14. The method of claim 13 wherein said detecting step further comprises the step of:

positioning detecting means with respect to at least one of said first and said second slots for detecting the entry of the leading end of the normally or excessively curled filmstrip therein.

15. The method of claim 14 wherein said detecting step further comprises the steps of:

emitting first and second light beams extending across the widths of said first and second slots, respectively; and detecting said first or second light beam in the absence of a leading end of a filmstrip extending into said first or second slot, respectively, and interrupting said first or second light beam, whereby first or second signals indicative of normally and excessively curled filmstrips may be generated.

16. Apparatus for detecting excessive core set film curl of a filmstrip wound within a film cartridge of the type having a light trapping film slit through which the leading end of the filmstrip may be advanced or retracted comprising:

means for positioning the film cartridge with the light trapping slit thereof oriented in a predetermined position;

means for unwinding the leading end of the filmstrip a predetermined distance out of the light trapping slit of the film cartridge, whereby the unwound leading end of the filmstrip may freely curl back in the direction in which the filmstrip is wound within the film cartridge to the extent that the filmstrip exhibits core set film curl; and means for detecting an excessive degree of core set film curl by the amount to which the unwound leading end of the filmstrip curls back toward the film cartridge.

17. The apparatus of claim 16 wherein said detecting means further comprises:

first deflecting means positioned with respect to said predetermined position for receiving the leading end of the advancing filmstrip evidencing a degree of film curl within a normal range of curl;

second deflecting means positioned with respect to said predetermined position film receiving the leading end of the advancing filmstrip evidencing an excessive degree of core set film curl beyond the normal range of film curl; and means for detecting the receipt of rite leading end of the filmstrip by at least one of said first and second detecting means.

18. The apparatus of claim 17 wherein said first and second deflecting means further comprise:

a deflector mechanism formed with a first slot for receiving normally curled filmstrips advanced by said advancing means and a second slot for receiving excessively curled filmstrips advanced by said advancing means, said deflector mechanism having deflector surfaces formed in relation to said first slot for deflecting said leading end of the advanced filmstrip evidencing a normal range of film curl.

19. The apparatus of claim 18 wherein said detecting means is positioned with respect to said first and said second slots for detecting the entry of the leading end of the normal or excessively curled filmstrip therein.

20. The apparatus of claim 18 wherein said detecting means further comprises:

first and second light emitting means positioned with respect to said first and second slot, respectively for emitting light in first and second light beams extending across the widths of said first and second slots, respectively; and first and second light detecting means positioned with respect to said first and second slots, respectively, for detecting said light beams in the absence of a leading end of a filmstrip extending into said first or second slot and interrupting said first or second light beam, whereby signals indicative of normal or excessively curled filmstrips may be generated.

* * * * *

UNITED STATES PATENT AND TRADEMARK OFFICE
CERTIFICATE OF CORRECTION

PATENT NO. : 5,373,337
DATED : December 13, 1994
INVENTOR(S) : Mattson

It is certified that error appears in the above-indentified patent and that said Letters Patent is hereby corrected as shown below:

Column 8, line 8, after "positioning" delete "rite" and insert --the--.
Column 8, line 31, after "means" delete "tier" and insert --for--.
Column 8, line 58, after "second" delete "slob" and insert --slots--.
Column 8, line 59, after "respectively," delete "tier" and insert --for--.
Column 10, line 16, after "slot" insert --for--.
Column 11, line 3, after "receipt of" delete "rite" and insert --the--.

Signed and Sealed this

Fourth Day of July, 1995

*Attest:*

BRUCE LEHMAN

*Attesting Officer*     *Commissioner of Patents and Trademarks*